United States Patent Office 2,786,849
Patented Mar. 26, 1957

2,786,849

PRODUCTION OF 5-(DELTA-HYDROXYBUTYL) HYDANTOIN

Harold Conroy, Plainfield, and William J. Paleveda, Rahway, N. J., assignors to Merck & Co., Inc., Rahway, N. J., a corporation of New Jersey No Drawing. Application January 6, 1955, Serial No. 480,292

5 Claims. (Cl. 260—309.5)

This invention relates to the production of 5-(delta-hydroxybutyl) hydantoin. More particularly, it is concerned with new methods of preparing 5-(delta-hydroxybutyl) hydantoin, and with novel intermediate products useful in the preparation of 5-(delta-hydroxybutyl) hydantoin.

The compound 5-(delta-hydroxybutyl) hydantoin is of value as an intermediate in the synthesis of the essential amino acid lysine. Since lysine, alpha, epsilon-diaminocaproic acid cannot be synthesized, at least in sufficient quantities, by animals, and must be obtained from external sources, it is of major commercial importance for supplementing animal feedstuffs.

Pursuant to processes described in the art, 5-(delta-hydroxybutyl) hydantoin can be converted to 5-(delta-halobutyl) hydantoin by reaction with HCl or HBr and the resulting halo compound can be reacted with ammonia followed by hydrolysis of the resulting 5-(delta-aminobutyl) hydantoin to obtain lysine.

One object the present invention is to provide new processes suitable for the production of 5-(delta-hydroxybutyl) hydantoin on a commercial scale. Another object is to provide the new compound 5-(delta-hydroxy butylidene) hydantoin which is a valuable intermediate in the preparation of 5-(delta-hyroxybutyl) hydantoin. These and other objects of our invention will be apparent from the detailed description hereinafter provided.

In accordance with our present invention, it is now found that 5-(2-furyl)-hydantoin can be converted to 5-(delta-hydroxybutyl) hydantoin by several methods which are suitable for the preparation of this compound on a commercial scale. In accordance with one method, 5-(2-furyl) hydantoin is hydrogenated in an alkaline medium to produce 5-(hydroxybutyl) hydantoin directly. Pursuant to the second method this compound is prepared by hydrogenating 5-(2-furyl) hydantoin in an acidic or neutral medium to obtain 5-(tetrahydro-2-furyl) hydantoin, reacting said tetrahydro-furyl hydantoin with a base to produce 5-(delta-hydroxy butylidene) hydantoin and hydrogenating said hydroxybutylidene hydantoin to form 5-(delta-hydroxybutyl) hydantoin. These processes can be shown as follows:

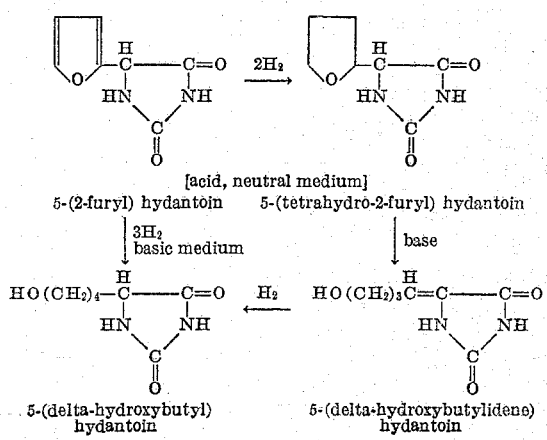

The starting compound, 5-(2-furyl) hydantoin, can be prepared by the reaction of furfural with ammonium carbonate and potassium cyanide. Since furfural is inexpensive and readily available, 5-(2-furyl) hydantoin is indeed a convenient starting material for the synthesis of lysine.

In accordance with one embodiment of our invention, it is now found that 5-(2-furyl) hydantoin is readily converted to 5-(delta-hydroxybutyl) hydantoin by reaction with hydrogen in the presence of a hydrogenation catalyst and a base. The reaction is most conveniently effected in a suitable solvent medium for the 5-(2-furyl) hydantoin and the base such as water, lower aliphatic alcohols, aqueous-lower aliphatic alcohol mixtures and the like.

Any of the catalysts usually employed in the hydrogenation of organic compounds such as the noble metals, noble metal oxides, Raney nickel, and the like can be employed in this reduction. However, we have found that the reaction is conveniently effected in the presence of palladium on charcoal, and we therefore prefer to use this catalyst in carrying out the reduction.

Although any base can be used in this reduction, we prefer to use an inorganic base such as an alkali metal hydroxide, or an alkali metal carbonate in this reaction. The amount of base used is not critical, and as little as 1 molar precent can be used, but we have found that an amount equivalent to about 5 to 10 molar percent based on the 5-(2-furyl) hydantoin is especially advantageous and will result in the production of maximum yields of the desired product under optimum conditions.

In carrying out this hydrogenation, the time required for the absorption of the required three moles of hydrogen will depend upon the particular catalyst and base used, as well as the reaction conditions employed. We find that the reduction can be carried out at either atmospheric or superatmospheric presures. In general, we prefer to conduct the hydrogen at pressures of about 10 to 50 p. s. i. g., since under these conditions the reduction is rapidly effected and it is not necessary to employ expensive, high presure hydrogenation equipment. The reaction can be carried out at temperatures up to about 150° C., although we usually prefer to effect the reduction at a temperature between about 50 and 100° C. since such temperatures are sufficiently high to cause the reaction to proceed rapidly without the formation of any undesirable by-products. Thus, we have obtained excellent yields of the desired 5-(delta-hydroxybutyl) hydantoin by hydrogenating 5-(2-furyl) hydantoin in an aqueous solution containing about 5 molar percent of either sodium hydroxide or sodium carbonate in the presence of palladium on charcoal at a temperature of about 80° C.

The desired 5-(delta-hydroxybutyl) hydantoin obtained by this hydrogenation reaction can be readily recovered from the reaction mixture by removing the catalyst and concentrating the resulting solution to dryness under reduced pressure. If desired, the product can be further purified by recrystallization from a suitable solvent such as ethanol.

In accordance with a further embodiment of our invention, it is also found that 5-(delta-hydroxybutyl) hydantoin can be conveniently prepared by hydrogenating 5-(2-furyl) hydantoin in an acidic or neutral medium in the presence of a hydrogenation catalyst to produce 5-tetrahydro-2-furyl) hydantoin, reacting this tetrahydrofuryl-hydantoin with a base to form 5-(delta-hydroxybutylidene) hydontoin, and hydrogenating said hydroxy butylidene hydantoin in the presence of a hydrogenation catalyst.

In the first step of this process, the 5-(2-furyl) hydantoin is reacted with hydrogen in a medium having a pH not in excess of about 7.0 in the presence of a hydrogenation catalyst such as the noble metals, noble metal oxides, or Raney nickel to produce the corresponding tetrahydro compound. This reduction is most conveniently effected in the presence of a suitable solvent for the 5-(2-furyl) hydantoin such as water, lower aliphatic alcohols, or aqueous-lower aliphatic alcohol mixtures. Although the reaction can be carried out at temperatures ranging from about room temperature to about 150° C., we prefer to carry out this step at a temperature of about 50° to 100° C., since at these temperatures the reaction is rapid and contains a minimum amount of by-products. The reduction can be effected at either atmospheric pressure or superatmospheric pressure, although we usually find it convenient to employ moderate pressure of about 10–50 p. s. i. g., since under these conditions the reaction is rapid and the need for using expensive, high-pressure equipment is avoided.

The desired 5-(tetrahydro-2-furyl) hydantoin is conveniently recovered from the resulting hydrogenation mixture by removing the catalyst and evaporating the resulting solution to dryness under reduced pressure. The product so obtained can be used directly in the next step of our process, although, if desired, it can be readily purified further by recrystallization from a suitable solvent such as ethanol.

The second step of our process is carried out by heating the tetrahydro-furyl hydantoin with a base to cleave the tetrahydro-furyl ring and form 5-(delta-hydroxy butylidene) hydantoin. This is readily accomplished by heating the tetrahydrofuryl hydantoin in the presence of an aqueous solution of an inorganic base such as an alkali metal hydroxide or an alkali metal carbonate on a steam bath for sufficient time to complete the reaction. The course of the reaction and the formation of the desired hydroxy butylidene hydantoin can be conveniently followed by determining the ultraviolet absorption of the reaction mixture. The 5-(delta-hydroxy butylidene) hydantoin formed by this cleavage reaction is recovered by cooling the reaction mixture whereupon crystals of the desired product separate and can be recovered by filtration or centrifugation.

The 5-(delta-hydroxy-butylidene) hydantoin can then be hydrogenated to obtain the desired hydroxybutyl hydantoin. This reduction is effected by intimately contacting the hydroxy-butylidene hydantoin with hydrogen in the presence of a hydrogenation catalyst at room temperature to produce 5-(delta-hydroxybutyl) hydantoin which is conveniently recovered from the reaction mixture by removing the catalyst and evaporating the resulting solution to dryness under reduced pressure.

This reduction can be carried out under the conditions described above for the conversion of 5-(2-furyl) hydantoin to the corresponding tetrahydrofuryl compound. Thus the reduction can be carried out by reacting the hydroxy butylidene hydantoin dissolved in a suitable inert solvent with hydrogen in the presence of a hydrogenation catalyst such as the noble metals, noble metal oxides, or Raney nickel at temperatures from about room temperature to about 150° C. and at either atmospheric or superatmospheric pressures. Generally, we find it most convenient to carry out the reduction at low pressures since the reaction is rapid under these conditions and the need to use expensive high-pressure equipment is avoided. For example, the hydroxy butyl hydantoin is conveniently obtained by hydrogenating the hydroxy butylidene hydantoin compound dissolved in 50% acetic acid at atmospheric pressure and room temperature. After completion of the reduction, the hydroxy butyl hydantoin is conveniently recovered by removing the catalyst, evaporating the filtrate to dryness, and recrystallizing the residue from ethanol.

The following examples are presented to illustrate the processes of our present invention:

EXAMPLE 1

*Preparation of 5-(delta-hydroxybutylidene) hydantoin*

Twenty grams (0.1085 M) of recrystallized 5-(2-furyl) hydantoin monohydrate in 200 ml. of water was hydrogenated at 80° C. in the presence of 1.3 gms. of 5% palladium on charcoal, at an initial hydrogen pressure of 30 p. s. i. g. The batch consumed 0.229 M of hydrogen (105% of theory) in two to three hours.

After cooling to room temperature, the mixture was filtered. To the filtrate containing the 5-(2-tetrahydrofuryl) hydantoin was added 250 mgms. (0.00625 M, 5 M% of starting material) of sodium hydroxide. The solution was heated on the steam bath for 7½ hours. Every hour a 1 mg. sample was taken to follow the course of the reaction by ultra violet absorption assay. The results were as follows:

1. 0.5 hr. Amount of product present: 26.7% of theory
2. 1.0 hr. Amount of product present: 52.8% of theory
3. 2.0 hr. Amount of product present: 71.2% of theory
4. 3.0 hr. Amount of product present: 76.5% of theory
5. 4.0 hr. Amount of product present: 80.2% of theory
6. 5.0 hr. Amount of product present: 82.0% of theory
7. 6.0 hr. Amount of product present: 85.5% of theory
8. 7.0 hr. Amount of product present: 88.2% of theory On cooling the solution to room temperature, crystals of 5-(delta-hydroxybutylidene) hydantoin separated. The mixture was aged in an ice bath for one hour, and filtered. The white solid was washed with a small amount of cold water and dried. This first crop weighed 8.135 gms. (44%, M. P. 185.0–187.5° C.; $\lambda$ max. 2200, $E\%=481$, $\lambda$ max. 2740, $E\%=481$, $\lambda$ max. 2740, $E\%=732$ (in water).

A second crop of less pure 5-(delta-hydroxybutylidene) hydantoin was obtained by concentrating the mother liquors to 50 ml., cooling, aging in ice for an hour, and filtering off the crystals so obtained. The yield of crop 2 was 3.72 gms. (20.2%) M. P. 175–179° C.; $\lambda$ max. 2200, $E\%=475$, $\lambda$ max. 2740, $E\%=722$.

When the mother liquors of the second crop were concentrated to 10 ml., a third crop of the product was obtained, which was worked up in the same manner. The yield of crop 3 was 1.645 gms. (8.9%), M. P. 151–160° C.

EXAMPLE 2

*Preparation of 5-(delta-hydroxybutyl) hydantoin from 5-(delta-hydroxybutylidene) hydantoin*

One gram of 5-(delta-hydroxybutylidene) hydantoin dissolved in 10 ml. of 50% acetic acid was hydrogenated with platinum oxide (100 mg.) at room temperature and atmospheric pressure. After the uptake of hydrogen had ceased, the catalyst was removed by filtration and the residue was recrystallized from ethanol. The crystalline 5-(delta-hydroxybutyl) hydantoin melted at 152–154° C.

EXAMPLE 3

*Preparation of 5-(delta-hydroxybutyl) hydantoin*

Ten grams (0.0544 M) of recrystallized 5-(2-furyl) hydantoin monohydrate in 100 ml. of water was hydrogenated at 80° C. in the presence of 650 mgms. of 5% Pd-C catalyst and 125 mgs. of sodium hydroxide, at an initial hydrogen pressure of 20 p. s. i. g. The batch took up 0.1568 M (96.5% of theory) of hydrogen. The first two moles of hydrogen were taken up rather rapidly (one hour), while the last mole was taken up slowly (three hours).

After cooling to room temperature and filtering off the catalyst, the filtrate was concentrated in vacuo to dryness. The crystalline residue was flushed twice with 30 ml. portions of 95% ethanol then dissolved by heating with 25 ml. of 95% ethanol. On cooling, white crystals of 5-(delta-hydroxybutyl) hydantoin were obtained.

The mixture was aged in an ice bath for one hour, then filtered. The cake was washed with a small amount of cold 95% ethanol, and dried. The yield of product was 8.23 gms. (88%), M. P. 152.8–155.8° C.

EXAMPLE 4

*Preparation of 5-(delta-hydroxybutyl) hydantoin*

9.9 gms. (0.0538 M) of 5-(2-furyl) hydantoin in 100 ml. of water was hydrogenated at 80° C. in the presence of 0.226 gm. (0.00269 M) of sodium bicarbonate and 0.65 gm. of 5% palladium on charcoal catalyst. The amount of hydrogen taken up was 0.1614 M (3 moles/mole of furyl hydantoin).

The catalyst was filtered off, and the aqueous solution was concentrated in vacuo to dryness. The crystalline residue was flushed twice with 30 ml. portions of absolute ethanol. Crystals of 5-(delta-hydroxybutyl) hydantoin were obtained on cooling. The mixture was filtered and the cake washed with a minimum amount of cold absolute ethanol to give 7.2 gms. (78%) of product, M. P. 151.0–153.5° C.

Any departure from the above description which conforms to the present invention is intended to be included within the scope of the claims.

We claim:

1. The process which comprises reacting 5-(2-tetrahydrofuryl) hydantoin with an inorganic base to produce 5-(delta-hydroxybutylidene) hydantoin.

2. The process of claim 1 wherein the inorganic base is an alkali metal hydroxide.

3. The process of claim 1 wherein the inorganic base is an alkali metal carbonate.

4. The process which comprises intimately contacting 5-(delta-hydroxybutylidene) hydantoin with hydrogen in the presence of a hydrogenation catalyst to produce 5-(delta-hydroxybutyl) hydantoin.

5. 5-(delta-hydroxybutylidene) hydantoin.

References Cited in the file of this patent

UNITED STATES PATENTS

| | | |
|---|---|---|
| 2,557,904 | Britton et al. | June 19, 1951 |
| 2,564,647 | Rogers | Aug. 14, 1951 |
| 2,564,649 | Rogers | Aug. 14, 1951 |
| 2,728,777 | Coffman et al. | Dec. 27, 1955 |